May 28, 1968  G. B. DOREY  3,385,232
RESILIENT HOPPER DOOR SEALING MEANS
Filed June 22, 1964  3 Sheets-Sheet 1

INVENTOR.
GORDON B. DOREY

AGENT

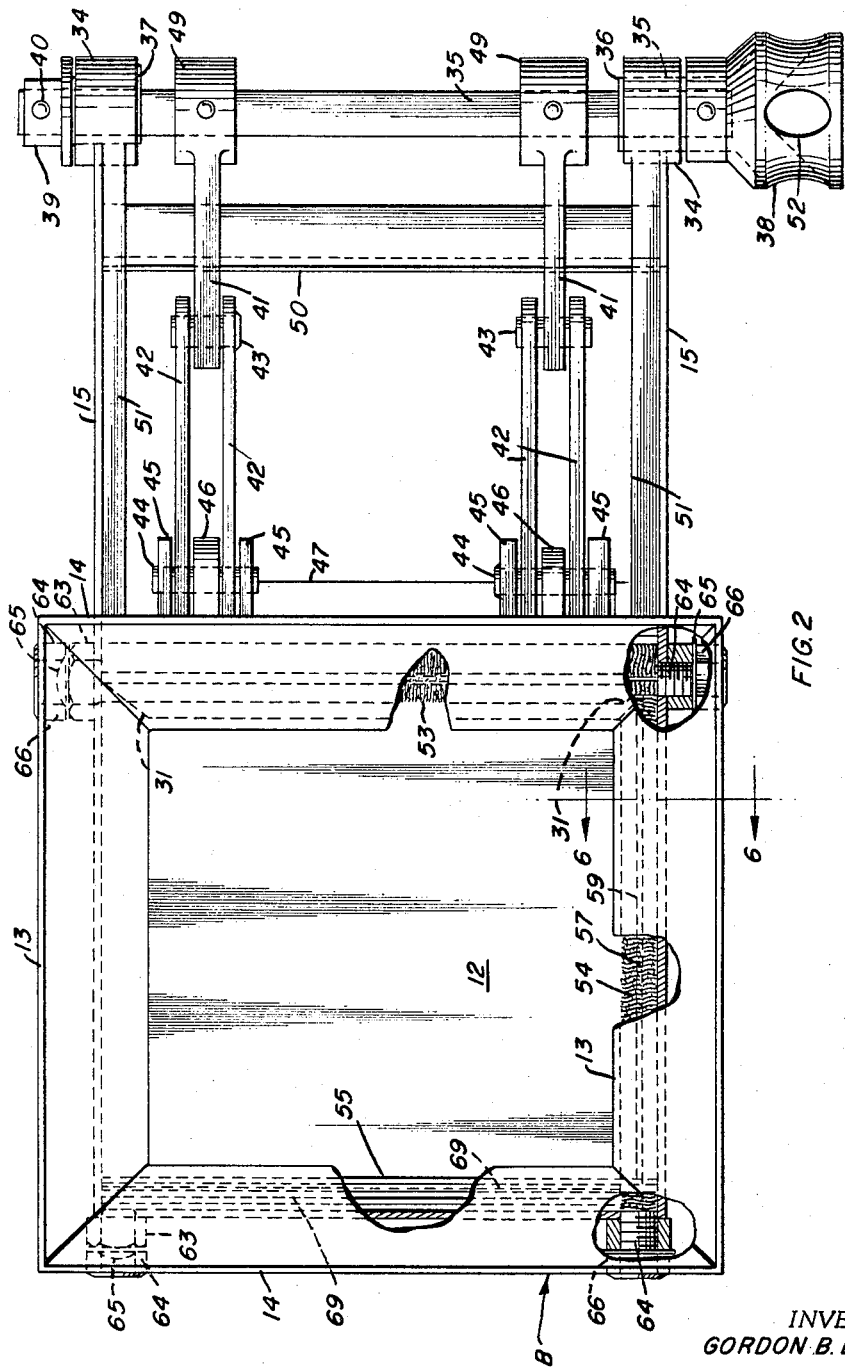

May 28, 1968　　　　　G. B. DOREY　　　　　3,385,232
RESILIENT HOPPER DOOR SEALING MEANS
Filed June 22, 1964　　　　　　　　　　　　　3 Sheets-Sheet 3
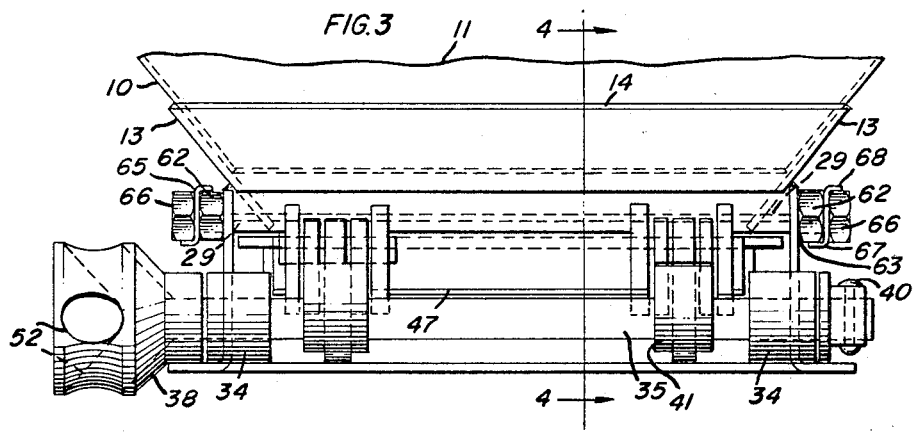
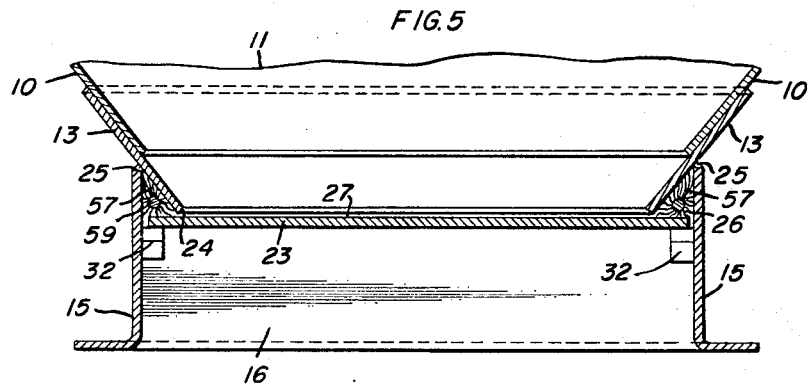
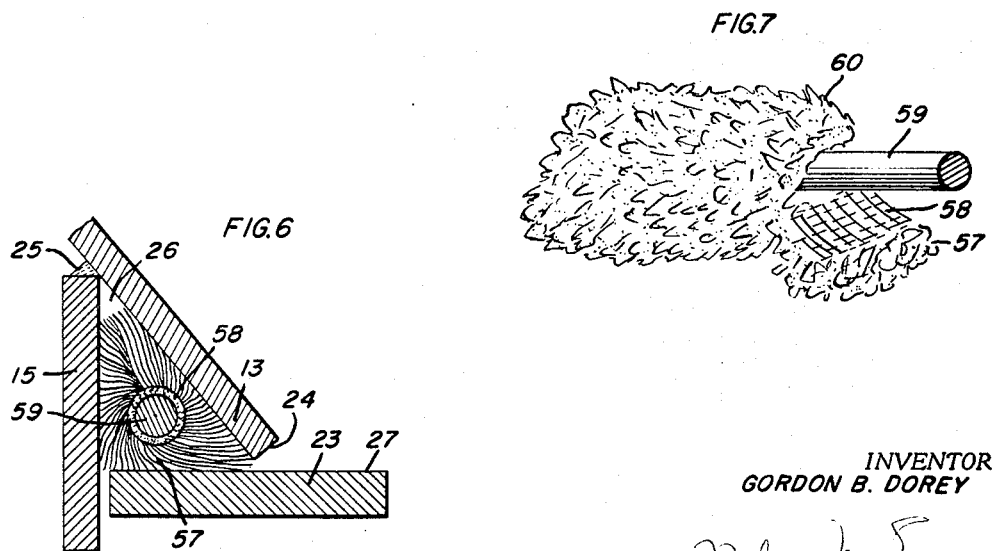
INVENTOR.
GORDON B. DOREY
AGENT 3,385,232
RESILIENT HOPPER DOOR SEALING MEANS
Gordon B. Derey, Westmount, Quebec, Canada, assignor to Continental Transport Appliances Limited, Montreal, Quebec, Canada, a corporation of Canada
Filed June 22, 1964, Ser. No. 376,832
6 Claims. (Cl. 105—253)

ABSTRACT OF THE DISCLOSURE

In a railway car hopper and hopper door lading discharge assembly, a sealing and packing means for preventing escape of lading while the door is closed while allowing entrapped air and moisture to escape. The means comprises four elements, one for each edge of the door and consisting for one edge of a tubular neoprene gasket or the like and for each of the other three edges a rigid rod having spirally wrapped thereon a tape having cemented to its outer surface by their ends, short lengths of moisture-resistant polyamide yarn resulting in an uneven, resilient, surface of closely packed yarn. Apertures in the hopper structure are provided for inserting the elements into place and holding them there, without removing any parts of the hopper assembly.

---

The invention relates to a sealing and packing means for applying about the edges of a hopper door in order to prevent the escape of finely comminuted lading while allowing accumulating air under pressure and moisture to escape through said means.

The invention is especially aplicable to, but not limited to, the sliding gate type of hopper assembly. It is especially adapted to the covered hopper cars used in great numbers for bulk transport of finely comminuted lading such as cement, potash, alumina and other materials of like nature.

In the past great difficulty has been experienced in producing hoppers and hopper discharge assemblies including doors, both with and without sealing means, for completely eliminating the leakage of the types of lading here involved.

Another difficulty arose because the lading is introduced into the car body rapidly and in large volume. This rapid loading causes the lading to entrap air. Often cargo is loaded hot causing condensation of moisture in the hoppers. The built-up air pressure would escape through hopper doors taking lading with it but usually —leaving the moisture behind.

Hopper doors have been equipped with a variety of forms of sealing means, all of which would usually leak the highly flowable lading. Other types of hopper doors intended to be leak-proof, built to "water-tight" specifications, prevented leakage of lading but also prevented leakage of unwanted water and air. As a result in extremely cold weather the doors froze shut, the lading where water was present froze into ice thus preventing discharge without the aid of ice-melting or breaking apparatus. The result was loss of time in unloading and of substantial amounts of valuable cargo; not to mention the losses due to scrapping the "watertight" hoppers.

Thus the users of hopper cars had one of two choices. They could lose lading through doors which let out water, or they could lose lading through destruction by water which could not escape.

My invention will solve the problem by providing a hopper assembly such as that described in the first paragraph above.

Briefly, the invention comprises a sealing means composed of a rigid metal bar, having spirally wrapped on it and cemented thereto a fabric tape. To the outer surface of the tape short lengths of a polyamide yarn are cemented at their ends leaving the intermediate portion free. The result is a wooly, angled surface of closely spaced yarn strands extending more or less radially from the axis of the bar. These sealing means are produced in lengths of approximately the same dimensions as the edges of the hopper doors they are intended for.

One of the objects of the invention is the provision of a packing means having extremely high resistance to moisture absorption.

Another object is to provide an arrangement of the parts of the packing means and of the hopper door assembly to provide for ready removal and replacement of the packing elements without the necessity of removing any parts of said assembly.

And another object is to provide a bordering frame structure about the hopper discharge opening having openings wherein the packing elements may be threadedly received and secured.

Yet another object is to provide a packing element comprising a rigid core or rod carrying a surface of closely spaced yarn elements presenting the wooly, tangled appearance of so-called "shaggy" rugs.

Still another object is to provide a packing element composed of a rigid metal rod having a tangled, piled surface of polyamide yarn elements which are highly resistant to absorption of moisture.

Other features of novelty will be fully described hereafter.

For further comprehension of the invention, reference may be had to the accompanying drawings wherein:

FIG. 2 is a plan view of the structure shown in FIG. 1, with certain parts broken away to better illustrate the invention and having the hopper walls eliminated.

FIG. 3 is a vertical end view of the structure shown in FIG. 1 as viewed from right to left.

FIG. 5 is a transverse vertical sectional view taken on a line 5—5 of FIG. 1.

FIG. 6 is an enlarged vertical fractional sectional view taken on a line 6—6 of FIG. 2.

FIG. 7 is a fractional perspective view illustrating the process of spirally winding the fabric tape base around a central core to form the packing element of circular shape.

Figure 1:
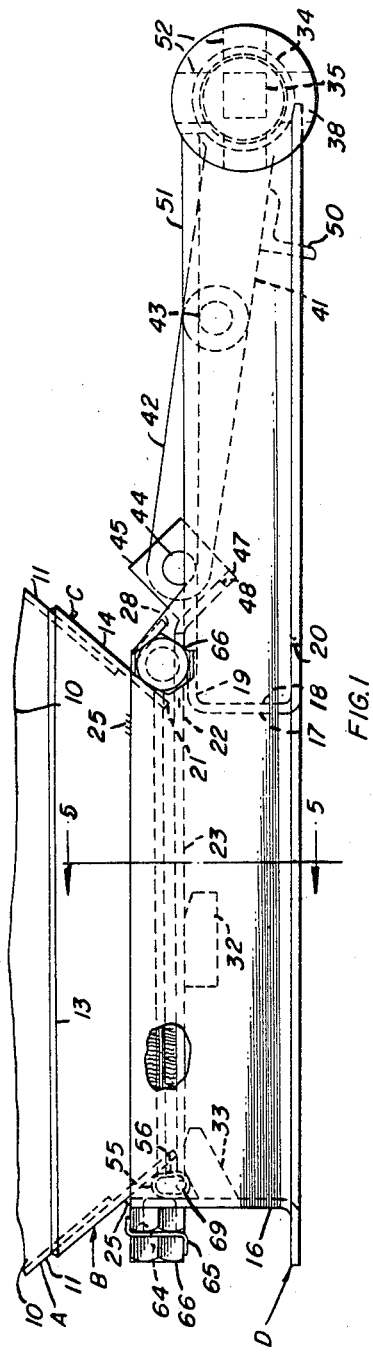
FIG. 1 is a side elevational view of the lower portion of a hopper with an outlet and gate assembly incorporating my invention therein, said view showing the gate in closed position and certain parts broken away to better illustrate features of my invention.

In said drawings a hopper of the type commonly used for controlling discharge of lading from a hopper car is shown at A and an outlet assembly incorporating the invention is shown at B. The said outlet assembly is shown as formed of upper and lower members as indicated at C and D respectively.

The hopper A is shown as including inwardly downwardly converging walls 10—10 which meet with oppositely converging walls 11—11 to form the four-sided hopper, said walls leading to a discharge area 12.

The outlet assembly B includes an upper portion having longitudinally extending side walls 13—13 disposed to overlie side walls 10—10 and other walls 14—14 extending transversely to overlie walls 11—11 of the hopper.

The upper portion as formed by walls 13 and 14 is of inverted truncate shape and rests in a lower framework. The lower frame section includes longitudinally extending wall members 15—15 connected with transversely extending wall members 16 and 17. The said wall members 15—15 in combination with transverse walls 16 and 17 together form a rectangular shaped chute-like enclosure which forms the final discharge opening.

The transverse wall 17 is of generally channel shape with a vertically disposed web 18 and upper and lower flanges as indicated at 19 and 20 respectively.

The upper flange 19 is spaced appreciably from the lower marginal edge 21 of overlying wall 14 to provide a slotted opening 22 through which a sliding gate 23 extends. The sliding gate 23 is movable to closed position through the slotted opening 22 towards the end wall 16. The gate 23 in closed position extends beneath the eaves 24 of the sloping walls 13 and 14.

The longitudinally extending side wall members 15—15 are extended upwardly above the level of the gate 23 to connect with the underside of the sloping walls 13 and welded thereto as at 25. The side wall members 15—15 are spaced appreciably from the eaves 24 of the associated upper sloping wall members 13 to form longitudinally extending triangular shaped chambers 26 forming housing presenting an open side to the upper surface 27 of the gate 23.

At the slotted end 22 of the discharge opening, the undersurface of the wall 14 is fitted at the lower portion with an angle-shaped member 28 disposed in inverted relation to form an open-sided triangular shaped housing 29. The flange 30 of the angle member 29 is cut away at each end at 31 to provide for continuity between housings 26 and 29.

The gate 23 is partially supported in closed position by side lugs 32—32 carried by the side wall members 15 and by end lugs 33 carried by the transverse end wall 16. The longitudinally extending side wall members 15—15 continue well beyond the discharge opening and are provided at their distal end with bearings 34 in which an operating shaft 35 is journalled. The shaft 35 is preferably of rectangular section and for the purpose of rotatably supporting the shaft in the bearings 34 there are provided circularly shaped hubs 36 and 37 at the respective sides of the frame. The hub 35 is preferably formed integrally with an operating head 38 located outwardly of one of the side wall members 15. The hub 37 includes a sleeve extension 39 lying outwardly of the supporting bearing and is mounted on an extension of the shaft and secured thereto by a rivet 40.

For moving the gate 23 by rotation of the shaft 35 there are provided connections between the shaft and gate including arm means 41 non-rotatably carried by the shaft and each arm is connected with the gate by means of links 42. The links 42 are arranged in pairs to straddle the arm means 41 and a pivotal connection is effected therewith as seen at 43. The opposite end of the links 42 connect at 44 with brackets 45—45 which are secured to the trailing end of the gate 23. The brackets 45—45 lie on opposite sides of the pair of links and said links are maintained in spaced relation by a spacer washer 46. The brackets 45—45 are preferably on a downwardly flanged extension of the gate as seen at 47 and said extension is coped out at 48 to permit straddling the hub 49 of the arm means when the gate is in the fully opened position. A transversely extending tie member 50 which extends between the side wall members 15—15 also acts as a stop to limit knuckling movement of the arms and links. The gate 23 throughout its opening movement rides on trackways 51—51 which in turn are carried by and extending inwardly from the side wall members 15—15.

Figure 4:
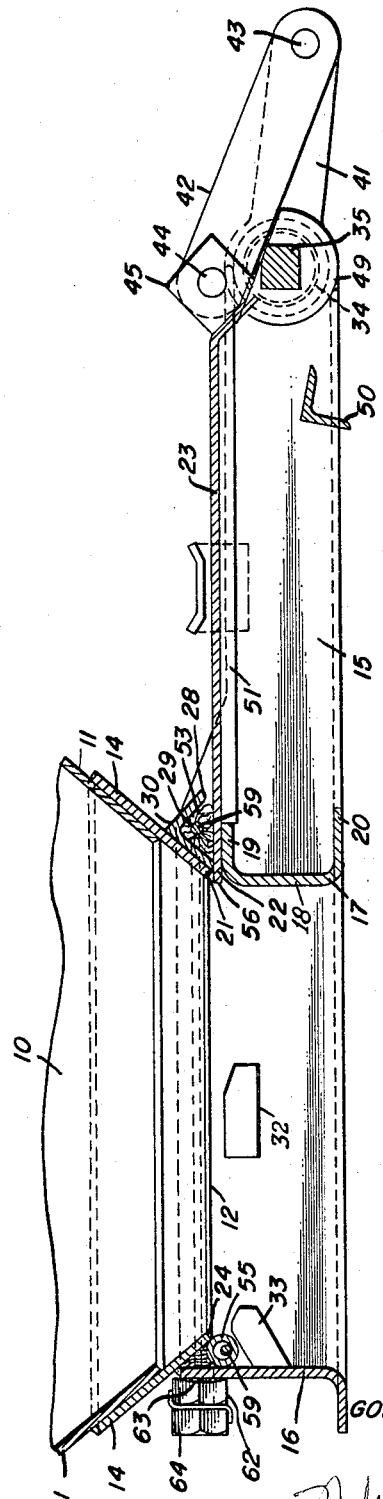
FIG. 4 is a vertical longitudinal sectional view, as taken on a line corresponding to a line 4—4 of FIG. 3, said view showing the gate in fully opened position.

The operating head 38 is provided with a series of openings 52 for receiving a removable actuating bar (not shown). Movement of the gate from closed to open position is effected by rotation of the shaft in a clockwise direction as viewed in FIG. 1 and the closing movement is effected by a half turn of the shaft in an anti-clockwise direction as viewed in FIG. 4.

The provision against leakage of lading between the gate and borders of the discharge opening includes transversely and longitudinally extending packings above the gate as indicated at 53 and 54 respectively and a neoprene tubular gasket 55 interposed between the leading edge 56 of the gate and the end wall 16 of the frame section B.

The packings 53 and 54 are in bar form and preferably consist of pile tufts 57 of polyamide yarn attached to a fabric base 58 of tape form spirally wound around a central core 59 and bonded thereto (FIG. 7). The pile tufts 57 are attached to the fabric base to lie at a normal thereto and by reason of the inherent resilience of the polyamide yarn are biased to lie at a normal to the base. The tufts 57, upon the base being spirally wound as indicated in FIG. 7, are then biased to extend radially from the core and the element then assumes a substantially circular form as indicated at 60 in FIG. 7.

The packing elements when positioned in the triangular shaped housings 26 and 29 assume a triangular shape as best seen in FIG. 6 and by virtue of the resilience in the tufts an abrasion resistant resilient contact of appreciable width is established between the packing and the upper face of the gate which effectively sweeps the gate clear of residual lading.

In order to permit ready installation or removal of the packings without the necessity of dismantling the gate, the side walls 15 and end wall 16 are apertured at 61 and interiorly screwthreaded sockets 62 surround said apertures and are welded to the associated walls as seen at 63. The apertures 61 are adapted to be closed by headed plugs 64 which are provided with screwthreads to register with the complementary screwthreaded sockets 62. Locking of plug 64 is effected by a tab washer 65 interposed between the head 66 of the plug and the outer face of the socket 62 and having reversely bent lips 67 and 68 engaging with the socket 62 and head 66 of the plug 64 respectively.

The transversely extending packing 53 in bar form is of a length to extend clear between the side walls 15—15 and the longitudinally extending packings 54, likewise in bar form, are each of a length to extend between the end wall 16 and the transversely extending packing 53 and when in operative position impinge on the transverse member, thereby forming a continuous seal above three sides of the gate.

The longitudinal packing elements 53 are supported in operative position at one end by the gate 23 and at the opposite end by the tubular neoprene gasket 55 which is rigidified for this purpose by a rod 69 extending therethrough. The tubular neoprene gasket is maintained under compression by contact with the leading edge of the gate when the latter is closed with the arm means 41 and linkage 42 in straightened toggle locked position (FIG. 1). There is thus provided complete sealing protection around the four sides of the discharge opening when the gate is in closed position.

A novel feature associated with the packing elements is the ability of the tufts to assume a prone position and recover therefrom, thereby enabling the threading of the elements through a restricted aperture and expanding after passing through. This expanding capacity of the packing elements makes it possible to employ apertures of less area than the housings and still fully occupy the housing space. The packing elements, after passing through the restricted apertures, expand appreciably to fill the triangular shaped housings and in the transition from a circular shape to a triangular one there is presented a wide area of contact with the surface of the gate (FIG. 6).

The wide area of contact with the gate presented by the expanded elements in combination with resilient pressure exerted thereon by contact with the walls of the inverted V shape housings enhances the sealing, filtering and brushing capacity of the elements.

In the drawings and specification there has been set forth a preferred embodiment of the invention and although specific terms are employed, they are used in a generic and descriptive sense only, and not for purposes of limitation, the scope of the invention being defined by the claims.

What I claim:
1. In a hopper assembly having an opening for discharge of lading and a sliding gate for closing said opening, in combination:
   (a) housing means extending about the periphery of said opening and presenting an open side to the edges of said gate when said gate closes the opening,
   (b) sealing means disposed in said housing for pressing against and sealing the edges of said gate against leakage of lading from said hopper when said gate is closed,
   (c) said sealing means comprising a separate element for each edge of the gate, certain of said elements presenting a rough or shaggy yarn-like surface, and
   (d) one of said elements being so disposed as to brush excess lading from said gate when it is opening and closing.

2. The combination defined by claim 1 in which one of said elements comprises a tubular neoprene gasket for sealing the door edge remote from the direction in which the door opens, and all said elements are resistant to absorption of moisture.

3. The combination defined by claim 2 in which apertures are provided in the housing means for insertion therethrough of the several sealing elements into said housing while maintaining the remainder of the hopper assembly fully assembled.

4. The combination defined by claim 3 in which the rough surfaced sealing elements are substantially cylindrical and comprise a rigid core and resilient surface, said apertures are smaller than the cross section of said elements, whereby the resilient surface compresses to pass through said apertures and expands when seated in the housing.

5. The combination defined by claim 4 in which said apertures comprise screw threaded means for holding said sealing elements in place.

6. The combination defined by claim 5 in which the resilient surface is composed of short lengths of tightly packed polyamide yarn cemented at their ends to a fabric base surrounding said rigid core, and said rough surfaced sealing elements are resistant to absorption of moisture.

References Cited
UNITED STATES PATENTS

| | | | |
|---|---|---|---|
| 543,932 | 8/1895 | Hall et al. | 49—485 |
| 1,546,575 | 7/1925 | Merick | 49—485 |
| 2,004,722 | 6/1935 | Hamm | 49—485 X |
| 2,171,728 | 9/1939 | Lee et al. | 49—475 |
| 2,257,603 | 9/1941 | Harrah | 49—475 |
| 2,602,402 | 7/1952 | Sanford et al. | 105—424 X |
| 2,656,586 | 10/1953 | Cowie et al. | 28—80 |
| 3,082,705 | 3/1963 | Dorey | 105—282 |
| 3,097,612 | 7/1963 | Dorey | 105—282 |
| 3,255,714 | 6/1966 | Dorey | 105—282 |
| 2,658,315 | 11/1953 | Peterson | 15—230.13 |
| 2,787,026 | 4/1957 | White | 29—127 X |
| 3,237,233 | 3/1966 | Adams | 15—230.13 |

ARTHUR L. LA POINT, *Primary Examiner.*

H. BELTRAN, *Assistant Examiner.*